UNITED STATES PATENT OFFICE.

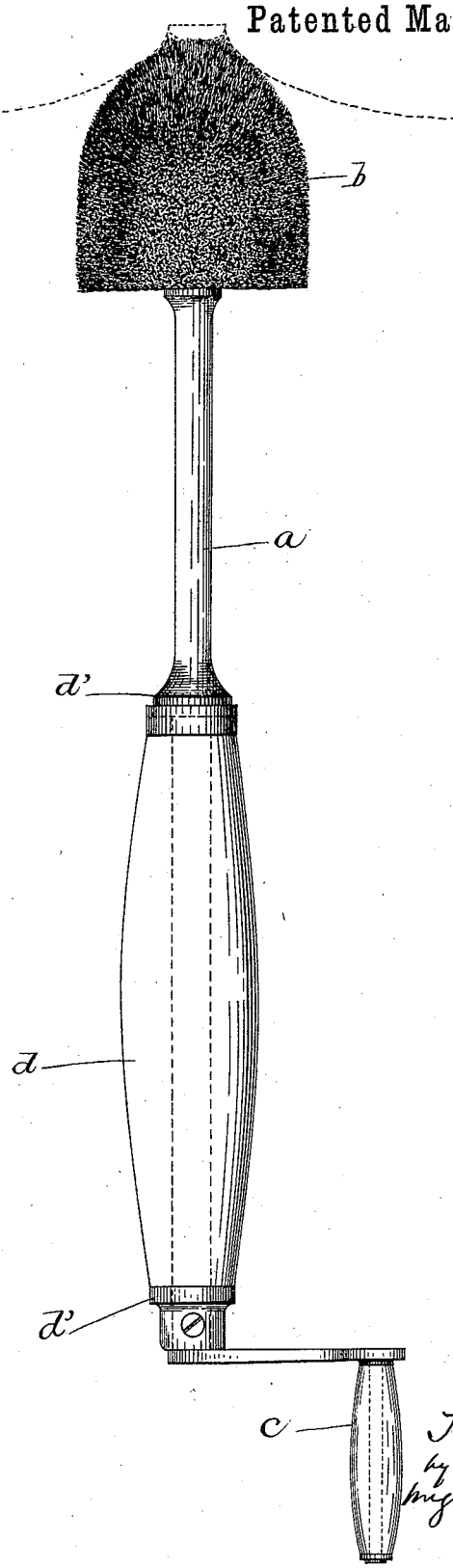

T. EMORY CLARK, OF BROOKLINE, MASSACHUSETTS.

ROTARY BRUSH.

SPECIFICATION forming part of Letters Patent No. 403,328, dated May 14, 1889.

Application filed November 3, 1886. Serial No. 217,867. (Model.)

*To all whom it may concern:*

Be it known that I, T. EMORY CLARK, of Brookline, in the county of Norfolk and State of Massachusetts, have invented certain new and useful Improvements in Rotary Brushes, of which the following is a specification.

This invention has for its object to provide a brush adapted to be held in one hand and rotated by the other for the purpose of removing dust and dirt from the depressions around buttons in carriage and furniture upholstery; and it consists in a peculiarly-formed brush having an outer convexed end to enter such depressions, and provided with a shank or spindle having an operating crank or handle, and a tubular handle, through which said shank passes and in which it is adapted to rotate, said tubular handle being formed to be grasped by the operator and constituting a bearing in which the brush-shank may be rotated, as I will now proceed to describe.

Of the accompanying drawing, forming a part of this specification, the figure represents a side view of my improved rotary brush.

In the drawing, $a$ represents the shank or spindle, having at one end a brush-head, $b$, which is formed to enter the depressions around the retaining-buttons of carriage and chair-back upholstery, cushions, &c. Said brush-head is made of bristles suitably affixed to the shank and extending entirely across one end of the latter, said bristles being arranged to present a brushing-surface of tapering form, the apex or smaller convexed end of which is in line with the shank $a$. This form enables the brush to enter and operate effectively on all parts of the button-depressions in upholstery, said depressions being of the form indicated by dotted lines in the figure. To the opposite end of the shank is affixed a crank, $c$, by which the brush may be rotated.

$d$ represents a tubular sleeve or handle, through which the brush-shank passes and in which said shank is adapted to rotate, suitable collars or enlargements $d'$ $d'$ being preferably provided on the shank to prevent it from moving endwise in the tubular handle. The sleeve or handle $d$ is sufficiently elongated to enable the operator to grasp it firmly, and is in line with the shank $a$, so that it does not add materially to the bulk of the device.

In operating the brush the operator grasps the handle $d$ in one hand and presents the brush to the depression to be cleaned, and at the same time rotates the crank $c$ with the other hand, thus causing the brush to rapidly and effectively remove the dust and dirt from the depression.

By employing the tapering form of brush having a convexed end, in connection with the shank or spindle, the handle, and operating-crank, the brush may be manipulated to tilt or oscillate the convexed end of the bristle-head in the depression, so that a portion of its bristles will sweep the contacting sides of the depressions, the bristles at the apex or convexed end meanwhile brushing the button or deepest portion. By this means it is possible to effectively clean the sides of the recess and still continue to brush the button. This capability will be found most advantageous in cleaning depressions larger than the brush. The operator, using both hands, is enabled to exert continuous pressure on the brush-shank with one hand and continuously rotate the shank with the other hand.

It is obvious that the brush may be used for cleaning various small depressions or recesses which are inaccessible to ordinary whisk brooms or brushes.

I am aware that a brush formed on a shank which is journaled in a holder and is provided with an operating-crank is not new; but in the only instances of the use of such brushes of which I am aware the brushing-surface has been practically cylindrical, surrounding the axis of the brush, but not extending over one end thereof—in other words, having none of its brush material in line with the axis or shank. Moreover, the handles of such brushes have been formed to project considerably to one side of the brush-shank instead of being tubular and in line with the shank.

I am also aware that a brush has been formed on a shank so as to extend across one end of the shank, the latter having no handle in which it is adapted to rotate.

Therefore, while I do not claim broadly the combination of a rotary brush-shank having a brush-head and an operating-crank with a handle in which said shank is journaled, nor a brush-shank having brush material extending across or covering one of its ends, what I do claim is—

As an improved article of manufacture, the herein-described rotary brush, comprising the rotary shank or spindle having a central and a lower collar, a tubular handle inclosing a portion of said shank and secured between said collars, the brush-head affixed to one end of said rotary shank or spindle and having its apex or convexed end extending across said end of the shank or spindle, and the crank secured to the end of said rotary shank or spindle, substantially as shown and described, whereby said brush is held by one hand and operated by the other.

In testimony whereof I have signed my name to this specification, in the presence of two subscribing witnesses, this 28th day of October, 1886.

T. EMORY CLARK.

Witnesses:
C. F. BROWN,
A. D. HARRISON.